D. McN. RAMSAY.
AIRCRAFT.
APPLICATION FILED MAR. 11, 1922.
1,431,683. 
Patented Oct. 10, 1922.
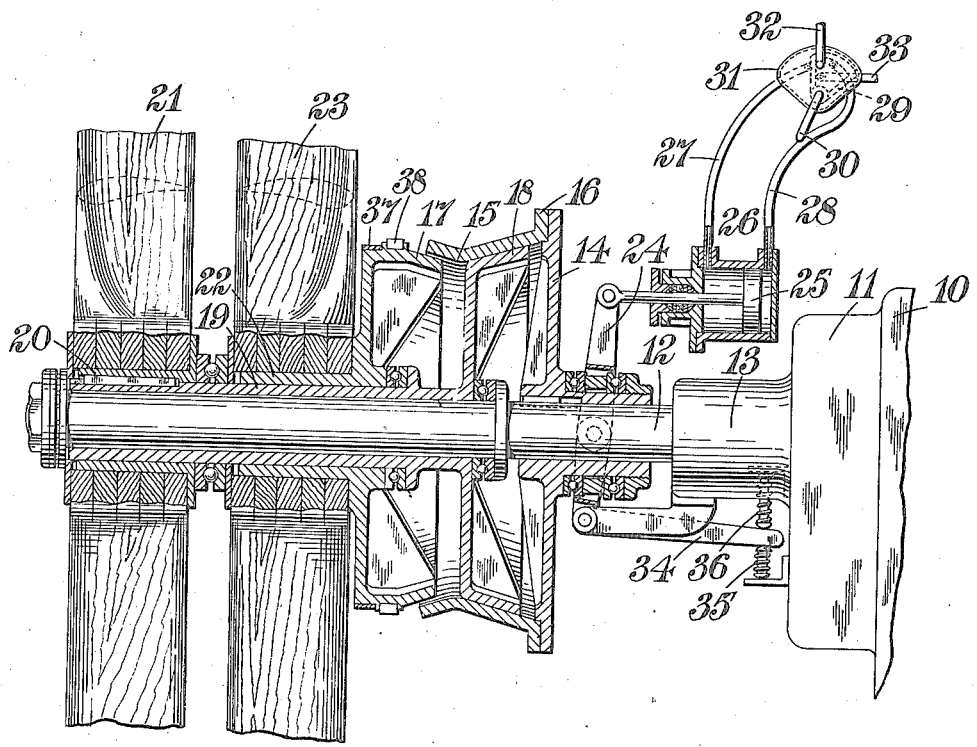
INVENTOR
David McNab Ramsay
by Byrnes, Stebbins, Burgess & Parmelee
his Attorneys Patented Oct. 10, 1922.

1,431,683

UNITED STATES PATENT OFFICE.

DAVID McNAB RAMSAY, OF GLASGOW, SCOTLAND, ASSIGNOR TO THE RAMSAY CONDENSING LOCOMOTIVE COMPANY LIMITED, OF GLASGOW, SCOTLAND, A BRITISH COMPANY.

AIRCRAFT.

Application filed March 11, 1922. Serial No. 543,110.

*To all whom it may concern:*

Be it known that I, DAVID McNAB RAMSAY, a subject of the King of England, residing at Glasgow, in Scotland, have invented certain new and useful Improvements in Aircraft, of which the following is a specification.

This invention is for improvements in or relating to aircraft of the type known as "heavier than air," that is to say, aircraft in which no aerostat is used. In such aircraft the lifting power is derived from the motion of the aircraft relatively to the air, and one of the difficulties in their use is the high speed at which they are compelled to alight on land or water so that alighting is possible only when a large area is available for their use. This difficulty is particularly serious in the case of aircraft which are designed to travel at a high speed, and also with large and heavy aircraft, and it is an object of this invention to provide an improved construction of aircraft which can be rapidly brought to rest after it has alighted, even at a high speed.

According to this invention there is provided in aircraft of the type described, the combination with the prime-mover, and an air-screw to be driven thereby for normal propulsion of the aircraft, of a second air-screw adapted to exert a retarding force in the direction opposite to the propelling force of the first air-screw, and a clutch-device for selectively engaging either air-screw with the prime-mover. Preferably such clutch-device is operated and held in its engaging position by fluid-pressure-actuated means, a convenient fluid being compressed air when an internal-combustion engine is used as the prime-mover, or steam when a steam-driven engine is used.

Preferably two oppositely-handed air-screws are mounted to rotate on a shaft common to both of them, and a clutch is provided to couple either of the air-screws to the prime-mover or to said shaft if it be the driving shaft.

It will be appreciated that when the machine is travelling normally, the retarding air-screw is free on its shaft, and may be set in rotation by its passage through the air, or by the action of the slip-stream of the main propeller upon it, and according to another feature of the invention, a braking device may be provided for the retarding air-screw to limit or prevent its rotation under these conditions; further, or alternatively, means may be provided for utilizing such motion of this air-screw by coupling it to a dynamo, pump, or other auxiliary machinery which is required to be driven whilst the air-craft is in flight, or to provide power for any desired purpose.

This invention may be applied to aircraft having any type of prime-mover, such as an internal-combustion engine, or condensing steam turbine equipment of the type described in the specification of my concurrent patent application Serial No. 533,757, filed February 3, 1922, and by way of example of this invention, there will now be described its application to the latter.

The accompanying drawing is a purely diagrammatic representation of the arrangement and controlling means for the two air-screws as above-mentioned.

In this drawing the reference 10 indicates the casing of the steam turbine, and the reference 11 the housing for a reduction gear by which the turbine drives a shaft 12. A suitable thrust-bearing is mounted in the housing 13 to take up the axial thrust developed by either of the air-screws when in use.

The shaft 12 carries the female clutch-member 14 which is keyed or otherwise rotatively locked to it, and is adapted to engage alternatively either of two male clutch-members. In the form illustrated the member 14 is provided with two conical engaging surfaces 15, 16 which can engage respectively with co-operating clutch-members 17, 18. The clutch member 18 is carried on a sleeve 19 whereon is keyed the hub 20 for an air-screw 21, and the member 17 is similarly rotatably engaged with the hub 22 of an air-screw 23. The member 17 with the hub 22 is so mounted as to be freely rotatable on the sleeve 19 aforesaid, suitable bearings and thrust-bearings being provided where desired.

The female clutch-member 14 is movable axially of the shaft 12 so that it can be engaged with either of the clutch-members 17, 18 to drive through them respectively either the air-screw 23 or the air-screw 21. These air-screws are oppositely-handed, so that although they are both driven in the same direction, the axial thrusts produced by them are in opposite directions, namely forward and backward with respect to the direction of normal flight of the machine.

Obviously any desired form of clutch may be used, and in practice it will generally be desirable to use a multiple-plate-clutch in order to provide for the effective transmission of the comparatively large power which will be developed, and in such a case it may be desirable to use two separate clutches which are alternatively rendered operative to transmit a drive to one or other of the air-screws.

The control of the clutches is preferably effected by fluid-pressure, and in the case illustrated in which a steam turbine is the prime-mover, steam is used for this purpose. The movable clutch-member 14 is coupled in any ordinary or desired manner by a lever 24 to a piston 25 movable in a cylinder 26. From each end of the cylinder communication is made by pipes 27, 28 to a controlling valve. This valve may take the form of a sector-shaped slide-valve 29 movable at the will of the pilot by an operating handle 30. This valve is located in a casing 31 whereto high pressure steam is admitted through a pipe-connection 32, and the valve 29 is so proportioned that it can place either the pipes 27, 28 in communication with the interior of the casing so that it receives high pressure steam; further, the valve is so proportioned that it can place both of the pipes 27, 28 simultaneously in communication, by way of the cavity in the valve, with an exhaust pipe 33 opening to atmosphere. When either of the pipes 27, 28 is open to steam, the other pipe is open to atmosphere. With this arrangement the high pressure steam can be admitted at the will of the pilot to either end of the cylinder 26 whilst the other end is open to atmosphere, so that the piston 25 is caused to move to one end or other of the cylinder, and thereby effect the necessary adjustment of the clutch-lever 24 and clutch.

It will be obvious that where two separate clutches are used the mechanism connecting them to the piston 25 can be arranged to operate them selectively, so that there is no risk of both clutches being simultaneously engaged with the driving-shaft. A similar result could also be obtained by using two separate operating pistons and cylinders, one for each clutch, and controlling the admission to the cylinders by means of a valve which selects one or other cylinder; or yet again, two separate interlocked valves could be used for admission of steam to two separate cylinders or to the two ends of a single cylinder.

In order to ensure positive declutching of the airscrews when the controlling valve is adjusted, there is provided a resilient control tending to maintain the clutch or clutches both in their disengaged position. In the arrangement illustrated this is effected by means of an extension or arm 34 secured on the lower end of the lever 24, to constitute a bell-crank lever. This arm 34 is engaged by two compression-springs 35, 36 which act on it in opposite directions, and are equally loaded when the arm is in its central position, which is the position in which the clutch-member 14 is disengaged from the two co-operating members 17, 18. When the clutch is moved into its engaging position by the steam pressure, one of the springs is compressed and the other is released. As soon as the steam pressure is released from the piston 25, the spring which is under compression positively returns the clutch to its disengaging position.

Since the two air-screws 21, 23 are mounted coaxially with one another, it will be appreciated that when either one of them is being driven, the consequent flow of air tends to drive the other air-screw. It may be allowed to do so freely, or it may be provided with any desired form of brake to retard or prevent such rotation. In the arrangement illustrated, the air-screw 21 is used for the normal propulsion of the machine and the air-screw 23 is used for retarding the machine in the manner hereinbefore described. Normally, therefore, the air-screw 21 is the driven one, and a brake-band 37 may be provided on the clutch-member 17 for the air-screw 23 to hold the latter stationary. No provision is made in this construction for retarding the movement of the air-screw 21 when the air-screw 23 is driven, since this state of affairs obtains only for a very small proportion of the total time that both air-screws are in use.

The brake 37 may be used to lock the air-screw 23, or merely to retard its movement, and, as stated above, the air-screw 23 may be allowed to rotate to provide power for any purpose which may be desired. Any convenient means may be provided for taking a drive from this air-screw, and in the form illustrated, the clutch-member 17 is provided with gear-teeth 38 on its periphery.

The method of operating an air-craft having retarding means fitted to it in accordance with the present invention is as follows.

Shortly before alighting, the clutch 16, 18, which is in engagement for normal propulsion by means of the air-screw 21, is disengaged, but the turbine is kept running at full speed under the control of its governor.

Before or on alighting, the retarding air-screw 23 is put into action by engaging the clutch 15, 17, the turbine gradually taking up the load as the clutch comes into engagement, until the full power is exerted in retarding the translational movement of the aircraft, so that it is stopped in the minimum distance.

It will be seen that the retarding force is applied in the same line of thrust as the normal propelling force, that is to say, at or vertically above the centre of gravity of the whole machine. There is thereby avoided the risk of tilting the machine over on its nose which is incurred with schemes for retardation in which the retarding force is applied below the centre of gravity, as for example, in braking the wheels of an aeroplane. Moreover, another result of using an air-screw to give a retarding effect is that it would tend to press down the tail of the aircraft and thereby further avoid the risk aforesaid.

The introduction of a friction-clutch between the prime-mover and the propulsion air-screw offers other advantages. Thus, in commencing a flight the prime-mover could be run up to full speed, and heated, so that it is in normal working condition before any load is put on it. Further, the use of retarding air-screws on machines fitted with twin propulsion equipments greatly facilitates the manœuvering of the aeroplane on the ground, since by running the propulsion air-screw on one side of the machine and the retarding air-screw on the other, the machine can be turned under its own power in the minimum space. When thus used for manœuvering, it would be desirable that the turbine governors should be operative at speeds less than the normal full speed. The manœuvering operations can be carried out with the propellers exerting only that proportion of full tractive force necessary to overcome the lesser tractive load of manœuvering in safety. This calls for a governor that will not only control the speed of rotation of the prime-mover at constant maximum (or normal speed, but will be capable of practically instantaneous adjustment, and also effectively control the rate of rotation at reduced speeds. Any desired form of governor may be used for this purpose.

What I claim as my invention and desire to secure by Letters Patent is:—

1. In an aeroplane, the combination of a prime-mover, an air-screw-shaft driven thereby, a sleeve mounted loosely upon said shaft, an air-screw mounted on said sleeve and rotatively locked thereto, a second sleeve mounted loosely upon the first said sleeve and located between the said air-screw and the prime-mover, a second air-screw of opposite hand to the first air-screw mounted on said second sleeve and rotatively locked thereto, and clutch-mechanism to engage rotatively at will either of said sleeves with the air-screw-shaft, substantially as described.

2. In an aeroplane, the combination of a prime-mover, an air-screw-shaft driven thereby, a sleeve mounted loosely upon said shaft, an air-screw mounted on said sleeve and rotatively locked thereto, a second sleeve mounted loosely upon the first said sleeve and located between the said air-screw and the prime-mover, a second air-screw of opposite hand to the first air-screw mounted on said second sleeve and rotatively locked thereto, clutch members, one carried by each of said sleeves, to rotate therewith, a single cooperating clutch member rotatively locked to the air-screw-shaft, and having sliding engagement therewith, and means to move the said cooperating clutch member into engagement with either of the first mentioned clutch-members, substantially as described.

3. In an aeroplane, the combination of a prime-mover, an air-screw-shaft driven thereby, a sleeve mounted loosely upon said shaft, an air-screw mounted on said sleeve and rotatively locked thereto, a second sleeve mounted loosely upon the first said sleeve and located between the said air-screw and the prime-mover, a second air-screw of opposite hand to the first air-screw mounted on said second sleeve and rotatively locked thereto, clutch members, one carried by each of said sleeves to rotate therewith, a single cooperating clutch-member rotatively locked to the air-screw-shaft, and having sliding engagement therewith, fluid-pressure clutch-actuating mechanism to move the said cooperating clutch-member into engagement with one or other of the first mentioned clutch-members, substantially as described.

4. In an aeroplane, the combination of a condensing steam turbine, an air-screw-shaft driven thereby, a sleeve mounted loosely upon said shaft, an air-screw mounted on said sleeve and rotatively locked thereto, a second sleeve mounted loosely upon said first mentioned sleeve and located between the said air-screw and the turbine, a second air-screw of opposite hand to the first air-screw mounted on said second sleeve and rotatively locked thereto, friction cone clutch members, one carried by each of said sleeves to rotate therewith, a single co-operating cone clutch member rotatively locked to the air-screw-shaft and having sliding engagement therewith, a plunger-and-barrel device adapted to move the said co-operating clutch member into engagement with either of the first mentioned clutch members, valve mechanism adapted to control the admission of high pressure steam to either end of said plunger-and-barrel device and balanced spring-impelling means adapted to exert a thrust on said co-operating clutch member in a direction to disengage it from either of the said first mentioned clutch members, substantially as described.

5. In an aeroplane, the combination of a condensing steam turbine, an air-screw-shaft driven thereby, a sleeve mounted loosely upon said shaft, an air-screw mounted on said sleeve and rotatively locked thereto, a second sleeve mounted loosely upon said first mentioned sleeve and located between the said air-screw and the turbine, a second air-screw of opposite hand to the first air-screw mounted on said second sleeve and rotatively locked thereto, friction cone clutch members, one carried by each of said sleeves to rotate therewith, a single co-operating cone clutch member rotatively locked to the air-screw-shaft and having sliding engagement therewith, a plunger-and-barrel device adapted to move the said co-operating clutch member into engagement with either of said first mentioned clutch members, valve mechanism adapted to control the admission of high pressure steam to either end of said plunger-and-barrel device, balanced spring-impelling means adapted to exert a thrust on said co-operating clutch member in a direction to disengage it from either of said first mentioned clutch members, and means on said second sleeve to transmit the motion of the second air-screw to a device that is required to be driven, substantially as described.

In testimony whereof I affix my signature.

DAVID McNAB RAMSAY.